United States Patent
Fukumine

(10) Patent No.: US 10,865,293 B2
(45) Date of Patent: Dec. 15, 2020

(54) CROSS-LINKABLE RUBBER COMPOSITION, RUBBER CROSSLINKED PRODUCT, AND COMPLEX

(71) Applicant: ZEON CORPORATION, Tokyo (JP)

(72) Inventor: Yoshio Fukumine, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/342,827

(22) PCT Filed: Oct. 24, 2017

(86) PCT No.: PCT/JP2017/038407
§ 371 (c)(1),
(2) Date: Apr. 17, 2019

(87) PCT Pub. No.: WO2018/079566
PCT Pub. Date: May 3, 2018

(65) Prior Publication Data
US 2019/0256693 A1    Aug. 22, 2019

(30) Foreign Application Priority Data
Oct. 31, 2016    (JP) ................................. 2016-213488

(51) Int. Cl.
| | |
|---|---|
| *C08L 13/00* | (2006.01) |
| *C08F 220/18* | (2006.01) |
| *C08F 222/26* | (2006.01) |
| *C08F 236/08* | (2006.01) |
| *C08F 236/12* | (2006.01) |
| *C08F 236/18* | (2006.01) |
| *C08K 3/22* | (2006.01) |
| *C08K 3/26* | (2006.01) |
| *C08K 5/17* | (2006.01) |
| *C08K 3/12* | (2006.01) |

(52) U.S. Cl.
CPC ............ *C08L 13/00* (2013.01); *C08F 220/18* (2013.01); *C08F 222/26* (2013.01); *C08F 236/08* (2013.01); *C08F 236/12* (2013.01); *C08F 236/18* (2013.01); *C08K 3/12* (2013.01); *C08K 3/22* (2013.01); *C08K 3/26* (2013.01); *C08K 5/17* (2013.01); *C08K 2003/2227* (2013.01); *C08K 2003/267* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 2008/0107905 A1* | 5/2008 | Odagawa ................ B32B 25/08 428/421 |
| 2017/0190806 A1 | 7/2017 | Obrecht et al. | |
| 2017/0253729 A1 | 9/2017 | Nakashima | |
| 2018/0030190 A1 | 2/2018 | Mosaki et al. | |

FOREIGN PATENT DOCUMENTS

| | | |
|---|---|---|
| EP | 2484700 A1 | 8/2012 |
| EP | 2902437 A1 | 8/2015 |
| JP | 2003-064224 A | 3/2003 |
| JP | 2005-126617 A | 5/2005 |
| JP | 2008-222891 A | 9/2008 |
| JP | 2012-135976 A | 7/2012 |
| JP | 2013-194234 A | 9/2013 |
| JP | 2016-006132 A | 1/2016 |
| JP | WO 2016/031848 * | 3/2016 |
| WO | 2016/031848 A1 | 3/2016 |
| WO | 2016/148055 A1 | 9/2016 |

OTHER PUBLICATIONS

Dec. 12, 2017 International Search Report issued in International Patent Application PCT/JP2017/038407.
May 29, 2020 Extended European Search Report issued in European Patent Application No. 17864526.3.
Sep. 11, 2020 Office Action issued in Chinese Patent Application No. 201780063637.7.

* cited by examiner

*Primary Examiner* — Ana L. Woodward
(74) *Attorney, Agent, or Firm* — Oliff PLC

(57) ABSTRACT

A disclosed crosslinkable rubber composition includes a carboxyl group-containing nitrile rubber (A) containing a halogen or a halogen compound, and having an iodine value of 120 or less; a polyamine-based crosslinking agent (B); and a metal-based acid acceptor (C).

6 Claims, No Drawings

CROSS-LINKABLE RUBBER COMPOSITION, RUBBER CROSSLINKED PRODUCT, AND COMPLEX

TECHNICAL FIELD

The present invention relates to a crosslinkable rubber composition, a rubber crosslinked product, and a complex using such a rubber crosslinked product.

BACKGROUND ART

Carboxyl group-containing highly saturated nitrile copolymer rubbers are known in the art, and an example of such a carboxyl group-containing highly saturated nitrile copolymer rubber includes a hydrogenated acrylonitrile-butadiene copolymer rubber having a carboxyl group. The carboxyl group-containing highly saturated nitrile copolymer rubber has less carbon-carbon unsaturated bonds contained in the main chain compared to a nitrile copolymer rubber such as an acrylonitrile-butadiene copolymer rubber. The rubber crosslinked product obtained thus exhibits excellent heat resistance, oil resistance, ozone resistance and the like, such that the rubber crosslinked product is used for various fuel oil hoses for automobiles, O-rings, Belts-in-oil and the like.

Patent Document 1, for example, discloses a crosslinkable rubber composition comprising a nitrile group-containing highly saturated copolymer rubber having an iodine value of 20 to 75, and a polyamine-based crosslinking agent mixed therein. The rubber crosslinked product obtained from the above-described crosslinkable rubber composition exhibits excellent compression set resistance and excellent adhesion to a metal (hereinafter referred to as metal adhesion).

However, metal adhesion of rubber crosslinked product needs to be maintained even under an environment of being immersed in LLC (Long-life coolant (cooling water)) in applications such as automobile radiators.

RELATED ART DOCUMENT

Patent Document

Patent Document 1: Japanese Unexamined Patent Publication No. 2016-6132

SUMMARY OF THE INVENTION

Problem to be Solved by the Invention

However, the carboxyl group-containing highly saturated nitrile copolymer rubber disclosed in the above Patent Document 1 is not necessarily satisfactory in view of metal adhesion of the obtained rubber crosslinked product under an environment of being immersed in LLC.

Thus, an object of the present invention is to provide a crosslinkable rubber composition designed to provide a rubber crosslinked product capable of exhibiting excellent compression set resistance, and capable of maintaining excellent metal adhesion even after being immersed in LLC.

Means for Solving the Problem

In order to solve the above-mentioned problems, one aspect of the present invention provides a crosslinkable rubber composition that includes a carboxyl group-containing nitrile rubber (A) containing a halogen or a halogen compound, and having an iodine value of 120 or less;

a polyamine-based crosslinking agent (B); and a metal-based acid acceptor (C).

Advantageous Effect of the Present Invention

According to an aspect of the present invention, a crosslinkable rubber composition is designed to provide a rubber crosslinked product capable of exhibiting excellent compression set resistance, and capable of maintaining excellent metal adhesion even after being immersed in LLC.

EMBODIMENTS FOR CARRYING OUT THE INVENTION

The following illustrates embodiments of the present invention in detail.

<Crosslinkable Rubber Composition>

A crosslinkable rubber composition according to an embodiment of the present invention includes a carboxyl group-containing nitrile rubber (A) containing a halogen or a halogen compound and having an iodine value of 120 or less, a polyamine-based crosslinking agent (B), and a metal-based acid acceptor (C). In the present embodiment, a nitrile rubber having an iodine value of 120 or less is a nitrile copolymer rubber having a relatively high hydrogenation ratio (hereinafter sometimes referred to as a "highly saturated nitrile rubber" or a "carboxyl group-containing highly saturated nitrile rubber").

<Carboxyl Group-Containing Nitrile Rubber (A)>

The carboxyl group-containing nitrile rubber (A) used in the present embodiment is not particularly specified, and may be any carboxyl group-containing nitrile rubber that contains a halogen or a halogen compound and has an iodine value of 120 or less. Such a carboxyl group-containing nitrile rubber to be used includes $\alpha,\beta$-ethylenically unsaturated nitrile monomer unit (a1), $\alpha,\beta$-ethylenically unsaturated dicarboxylic acid monoester monomer unit (a2), and a conjugated diene monomer unit (a3), wherein at least a part of the conjugated diene monomer unit (a3) is hydrogenated.

The $\alpha,\beta$-ethylenically unsaturated nitrile monomer is not particularly specified, and may be any $\alpha,\beta$-ethylenically unsaturated compound having a nitrile group. Examples of such an $\alpha,\beta$-ethylenically unsaturated nitrile monomer include acrylonitrile; $\alpha$-chloroacrylonitrile such as $\alpha$-bromoacrylonitrile, and $\alpha$-halogenoacrylonitrile; $\alpha$-alkylacrylonitrile such as methacrylonitrile and ethacrylonitrile; and the like. Of these, acrylonitrile and methacrylonitrile are preferable, and acrylonitrile is more preferable. The $\alpha,\beta$-ethylenically unsaturated nitrile monomer may be used alone as a single type, or may be used in combination as a plurality of types.

The content of the $\alpha,\beta$-ethylenically unsaturated nitrile monomer unit (a1) in the carboxyl group-containing nitrile rubber (A) is 5 to 60 wt %, preferably 10 to 55 wt %, and more preferably 12 to 50 wt %, in the total monomer units. In the present specification, "wt %" or "% by weight" is synonymous with "mass %". If the content of the $\alpha,\beta$-ethylenically unsaturated nitrile monomer unit is too small, the oil resistance of the rubber crosslinked product obtained may be lowered. If, however, the content of the $\alpha,\beta$-ethylenically unsaturated nitrile monomer unit is too large, the cold resistance of the rubber crosslinked product obtained may be lowered.

The monomer forming the α,β-ethylenically unsaturated dicarboxylic acid monoester monomer unit (a2) is not particularly specified, and may be any α,β-ethylenically unsaturated dicarboxylic acid monoester monomers having one unsubstituted (free) carboxyl group which is not esterified. The unsubstituted carboxyl group is used primarily for crosslinking. Having the α,β-ethylenically unsaturated dicarboxylic acid monoester monomer unit (a2) provides a rubber crosslinked product that exhibits excellent mechanical properties such as elongation and superior compression set resistance.

As an organic group bonded to a carbonyl group via an oxygen atom constituting a part of an ester bond in the α,β-ethylenically unsaturated dicarboxylic acid monoester monomer, an alkyl group, a cycloalkyl group and an alkyl cycloalkyl group are preferable, and an alkyl group is particularly preferable. When the organic group is bonded to the carbonyl group is an alkyl group, the number of carbon atoms of the alkyl group is preferably 1 to 12, and more preferably 2 to 6. When the organic group is bonded to a cycloalkyl group, the number of carbon atoms of the cycloalkyl group is preferably 5 to 12, and more preferably 6 to 10. Further, when the organic group bonded to an alkylcycloalkyl group, the number of carbon atoms of the alkylcycloalkyl group is preferably 6 to 12, and more preferably 7 to 10. If the number of carbon atoms of the organic group bonded to the carbonyl group is too small, the processing stability of the crosslinkable rubber composition may be deteriorated. If, however, the number of carbon atoms of the organic group bonded to the carbonyl group is too large, the crosslinking rates may be lowered, or mechanical properties of the resultant rubber crosslinked product may be deteriorated.

Examples of the α,β-ethylenically unsaturated dicarboxylic acid monoester monomer that forms α,β-ethylenically unsaturated dicarboxylic acid monoester monomer unit (a2) may include a maleate monoalkyl ester such as monomethyl maleate, monoethyl maleate, monopropyl maleate and mono-n-butyl maleate; a maleate monocycloalkyl ester such as monocyclopentyl maleate, monocyclohexyl maleate and monocycloheptyl maleate; a maleate monoalkylcycloalkyl ester such as monomethyl cyclopentyl maleate and monoethyl cyclohexyl maleate; a fumarate monoalkyl ester such as monomethyl fumarate, monoethyl fumarate, monopropyl fumarate and mono-n-butyl fumarate; a fumarate monocycloalkyl ester such as monocyclopentyl fumarate, monocyclohexyl fumarate and monocycloheptyl fumarate; a fumarate monoalkylcycloalkyl ester such as monomethyl cyclopentyl fumarate and monoethyl cyclohexyl fumarate; a citraconic acid monoalkyl ester such as monomethyl citraconic acid, monoethyl citraconic acid, monopropyl citraconic acid and mono-n-butyl citraconic acid; a citraconic acid monocycloalkyl ester such as monocyclopentyl citraconic acid, monocyclohexyl citraconic acid and monocycloheptyl citraconic acid; a citraconic acid monoalkylcycloalkyl ester such as monomethyl cyclopentyl citraconic acid and monoethyl cyclohexyl citraconic acid; an itaconic acid monoalkyl ester such as monomethyl itaconate, monoethyl itaconate, monopropyl itaconate and mono-n-butyl itaconate; an itaconic acid monocycloalkyl ester such as monocyclopentyl itaconic acid, monocyclohexyl itaconic acid and monocycloheptyl itaconic acid; an itaconic acid monoalkylcycloalkyl ester such as monomethyl cyclopentyl itaconic acid and monoethyl cyclohexyl itaconic acid; etc.

Among these, monopropyl maleate, mono n-butyl maleate, monopropyl fumarate, mono n-butyl fumarate, monopropyl citraconate, mono n-butyl citraconate; or another mono ester of a dicarboxylic acid having carboxyl groups at the two carbon atoms forming the α,β-ethylenically unsaturated bonds is preferable, mono n-butyl maleate, monopropyl citraconate, or another mono ester of a dicarboxylic acid having the two carboxyl groups at the cis positions (cis arrangement) is preferable, and mono n-butyl maleate is particularly preferable. The α,β-ethylenically unsaturated dicarboxylic acid monoester monomer may be used alone as a single type, or may be used in combination as a plurality of types.

The content of the α,β-ethylenically unsaturated dicarboxylic acid monoester monomer unit (a2) in the carboxyl group-containing nitrile rubber (A) is 0.5 to 12 wt %, preferably 1 to 10 wt %, and more preferably 2 to 8 wt %, in the total monomer units. If the content of the α,β-ethylenically unsaturated dicarboxylic acid monoester monomer unit (a2) is too small, mechanical properties and compression set resistance of the resultant crosslinked rubber may be deteriorated. If, however, the content of the α,β-ethylenically unsaturated dicarboxylic acid monoester monomer unit (a2) is too large, scorch stability of the crosslinkable rubber composition may deteriorate, and the fatigue resistance of the rubber crosslinked product obtained may deteriorate.

Examples of the conjugated diene monomer forming the conjugated diene monomer unit (a3) include 1,3-butadiene, isoprene, 2,3-dimethyl-1,3-butadiene, 1,3-pentadiene, chloroprene, and the like. Of these, 1,3-butadiene is preferable.

The content of the conjugated diene monomer unit (a3) in the carboxyl group-containing nitrile rubber (A) is 20 to 90 wt %, preferably 20 to 80 wt %, and more preferably 30 to 65 wt %, in the total monomer units. If the content of the conjugated diene monomer unit (a3) is too small, the rubber elasticity of the resultant rubber crosslinked product may be lowered. If, however, the content of the conjugated diene monomer unit (a3) is too large, chemical stability of the resultant rubber crosslinked product may be impaired.

Further, in addition to the α,β-ethylenically unsaturated nitrile monomer unit (a1), the α,β-ethylenically unsaturated dicarboxylic acid monoester monomer unit (a2), and the conjugated diene monomer unit (a3), the carboxyl group-containing nitrile rubber (A) used in the present embodiment may further contain (meth)acrylic acid alkyl ester monomer unit (a4). Here, "(meth)acrylic acid" means at least one type selected from "acrylic acid" and "methacrylic acid".

Examples of the (meth)acrylic acid alkoxyalkyl ester monomer forming the (meth)acrylic acid alkoxyalkyl ester monomer unit (a4) include (meth)acrylic acid ester monomer having a chain or cyclic saturated hydrocarbon group having 1 to 8 carbon atoms such as methyl (meth)acrylate, ethyl (meth)acrylate, propyl (meth)acrylate, isopropyl (meth) acrylate, (meth) acrylate, isobutyl (meth)acrylate, n-amyl (meth)acrylate, isoamyl (meth)acrylate, n-hexyl (meth)acrylate, 2-ethylhexyl (meth)acrylate, and cyclohexyl (meth)acrylate; (meth)acrylic acid ester monomer having an alkoxyalkyl group such as (meth)acrylate such as methoxymethyl (meth) acrylate, ethoxymethyl (meth)acrylate, 2-ethoxyethyl (meth)acrylate, 2-butoxyethyl (meth) acrylate, 2-methoxyethyl (meth)acrylate, 2-propoxyethyl (meth)acrylate, 3-methoxypropyl (meth)acrylate, and 4-methoxybutyl (meth)acrylate; and the like.

Among these, the (meth)acrylate monomer having an alkoxyalkyl group is preferable; and the number of carbon atoms of the alkoxyalkyl group is preferably 2 to 8, is more preferably 2 to 6, and is further preferably 2 to 4.

The content of the (meth)acrylic acid alkoxyalkyl ester monomer unit (a4) in the carboxyl group-containing nitrile rubber (A) is 12 to 50 wt %, preferably 15 to 45 wt %, and more preferably 18 to 40 wt %, in the total monomer units. The (meth)acrylic acid alkyl ester monomer unit (a4) being included based on the above-described content can provide a crosslinked rubber that exhibits excellent oil resistance and cold resistance.

Further, the carboxyl group-containing nitrile rubber (A) used in this embodiment may contain, in addition to the monomer units described above, units of other monomers that can be copolymerized with monomers forming these monomer units. Other monomers which can form copolymerizable monomer units include, for example, α,β-ethylenically unsaturated carboxylic acid ester monomers (apart from the aforementioned α,β-ethylenically unsaturated dicarboxylic acid monomers and (meth)acrylic acid alkyl ester monomers), α,β-ethylenically unsaturated carboxylic acid monomers, α,β-ethylenically unsaturated polyvalent carboxylic acid monomers, α,β-ethylenically unsaturated polyvalent carboxylic anhydride monomers, aromatic vinyl monomers, fluorine-containing vinyl monomers, copolymerizable nitrogen-containing monomers, and the like.

Examples of α,β-ethylenically unsaturated carboxylic acid ester monomers include amino group-containing (meth)acrylic acid alkyl ester monomers such as 2-aminoethyl (meth)acrylate, aminomethyl (meth)acrylate and the like; 2-hydroxyethyl acrylate, 3-hydroxypropyl methacrylate, or another (meth)acrylic acid hydroxyalkyl ester monomer which has alkyl groups with 1 to 16 carbon atoms; fluoroalkyl group-containing (meth)acrylic acid alkyl ester monomer such as trifluoroethyl (meth) acrylate, difluoromethyl (meth) acrylate; dialkyl maleate esters such as dimethyl maleate and di-n-butyl maleate; dialkyl fumarate such as dimethyl fumarate, fumarate, di-n-butyl fumarate and the like; maleic acid dicycloalkyl esters such as dicyclopentyl maleate and dicyclohexyl maleate; fumaric acid dicycloalkyl esters such as dicyclopentyl fumarate and dicyclohexyl fumarate; itaconic acid dialkyl ester such as dimethyl itaconate, di-n-butyl itaconate and the like; itaconic acid dicycloalkyl ester such as itaconic acid dicyclohexyl; and the like.

Examples of the α,β-ethylenically unsaturated monocarboxylic acid monomer include acrylic acid, methacrylic acid, ethylacrylic acid, crotonic acid, cinnamic acid and the like.

Examples of the α,β-ethylenically unsaturated polyvalent carboxylic acid monomer include itaconic acid, fumaric acid, maleic acid and the like.

Examples of the α,β-ethylenically unsaturated polyvalent carboxylic anhydride monomer include maleic anhydride, itaconic anhydride, citraconic anhydride and the like.

Examples of the aromatic vinyl monomer include styrene, α-methylstyrene, vinylpyridine and the like.

Examples of the fluorine-containing vinyl monomers include fluoroethyl vinyl ether, fluoropropyl vinyl ether, ortho-trifluoromethyl styrene, vinyl pentafluorobenzoate, difluoroethylene, tetrafluoroethylene and the like.

Examples of the copolymerizable nitrogen-containing monomers include antiaging agents such as N-(4-anilinophenyl)acrylamide, N-(4-anilinophenyl)methacrylamide, N-(4-anilinophenyl)cinnamimide, N-(4-anilinophenyl)crotonamide, N-phenyl-4-(3-vinylbenzyloxy)aniline, N-phenyl-4-(4-vinylbenzyloxy)aniline, and the like.

These other copolymerizable monomers may be used alone as a single type, or may be used in combination as a plurality of types. The content of the other monomer unit is preferably 50 wt % or less, more preferably 30 wt % or less, and more preferably 10 wt % or less, with respect to the total monomer units forming the carboxyl group-containing nitrile rubber (A).

The iodine value of the carboxyl group-containing nitrile rubber (A) used in this embodiment is 120 or less, preferably 60 or less, more preferably 40 or less, and particularly preferably 20 or less. In this embodiment, the carboxyl group-containing nitrile rubber includes predetermined amounts of the monomers described above, and the iodine value being within a predetermined range; and this carboxyl group-containing nitrile rubber is further combined with the polyamine-based crosslinking agent (B) described below, which provides rubber crosslinked product having superior compression set resistance and metal adhesion. If the iodine value is too low, the resultant rubber crosslinked product may be less resistant to cold. If, however, the iodine value is too high, the heat resistance of the resultant rubber crosslinked product may be reduced.

Note that as a method for setting the iodine value of the carboxyl group-containing nitrile rubber (A) in the above-described range, there is a method for controlling the iodine value by appropriately adjusting the type of the hydrogenation catalyst, the amount of the hydrogenation catalyst, the reaction temperature, the hydrogen pressure, and the reaction time in the hydrogenation reaction when manufacturing the carboxyl group-containing nitrile rubber (A). Specifically, the lower iodine value may be obtained by increasing the amount of hydrogenation catalyst. Similarly, the lower iodine value may be obtained by increasing the reaction temperature, hydrogen pressure, or reaction time. Accordingly, the iodine value can be controlled by appropriately adjusting these conditions in this embodiment.

In addition, a polymer-Mooney viscosity (ML1+4, 100° C.) of the carboxyl group-containing nitrile rubber (A) used in this embodiment is preferably 10 to 200, more preferably 15 to 150, more preferably 15 to 100, and particularly preferably 20 to 70. By adjusting the polymer-Mooney viscosity to fall within the above range, the processability of the crosslinkable rubber composition can be improved without impairing the mechanical properties of the resultant rubber crosslinked product.

The carboxyl group-containing nitrile rubber (A) used in this embodiment includes a halogen or a halogen compound. Such halogens or halogen compounds may be mixed into or remain within, as residual halogens (e.g., chlorine) derived from the coagulant, a carboxyl group-containing nitrile rubber when the latex of the carboxyl group-containing nitrile rubber described below is coagulated. Note that during filtration of the coagulated nitrile rubber containing the carboxyl group, the solids (crumbs) are washed; however, completely removing such halogens or halogen compounds is difficult.

Halogens or halogen compounds include halogens such as fluorine, chlorine, bromine, or halogen compounds thereof. The amount of halogen or halogen compound contained in the carboxyl group-containing nitrile rubber (A) is not particularly specified, but is normally 100 to 9000 ppm as a single halogen with respect to the carboxyl group-containing nitrile rubber (A), preferably 8000 ppm or less, and more preferably 6000 ppm or less. Note that if the amount of halogen or halogen compound contained in the carboxyl group-containing nitrile rubber (A) is too large, the metal adhesion may be reduced.

The method of producing the carboxyl group-containing nitrile rubber (A) used in this embodiment is not particularly specified, but the carboxyl group-containing nitrile rubber (A) used in this embodiment may preferably be produced by copolymerizing the monomers described above with emulsion polymerization using an emulsifier to prepare latex of nitrile rubber, and hydrogenating the obtained latex. For the emulsion polymerization, the emulsifier, a polymerization initiator, and a molecular weight-adjuster, and polymerization auxiliary materials commonly used can be used.

Examples of emulsifier used may include, but are not particularly limited to, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzene sulfonate, higher alcohol sulfuric acid ester salts, and alkyl sulfosuccinic acid salts; and copolymerizable emulsifiers such as sulfo esters of α,β-unsaturated carboxylic acids, sulfate esters of α,β-unsaturated carboxylic acids, sulfoalkylaryl ethers, and the like. The amount of the emulsifier used is preferably 0.1 to 10 parts by weight with respect to 100 parts by weight of the total amount of monomers used for polymerization.

Examples of the polymerization initiator may include, but are not particularly limited to, inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl, peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone as a single type, or may be used in combination as a plurality of types. As the polymerization initiator to be used, an inorganic or organic peroxide is preferable. When a peroxide is used as a polymerization initiator, the peroxide can be used in combination with a reducing agent such as sodium bisulfite or ferrous sulfate as a redox-type polymerization initiator. The amount of the polymerization initiator used is preferably 0.01 to 2 parts by weight, with respect to 100 parts by weight of the total amount of monomers used for polymerization.

Examples of molecular weight adjusters used may include, but are not limited to, mercaptans such as t-dodecyl mercaptan, n-dodecyl mercaptan, octyl mercaptan; halogenated hydrocarbons such as carbon tetrachloride, methylene chloride, methylene bromide; α-methylstyrene dimer; sulfur-containing compounds such as tetraethyl thiuram disulfide, dipentamethylene thiuram disulfide, diisopropylxanthogendisulfide, and the like. These molecular weight adjusters can be used alone as a single type, or may be used in combination as a plurality of types. Among these, mercaptans are preferable, and t-dodecylmercaptan is more preferable. The amount of molecular weight adjusters used is preferably 0.1 to 0.8 parts by weight with respect to 100 parts by weight of the total amount of monomers.

Water is commonly used as a medium for emulsion polymerization. The amount of water used is preferably 80 to 500 parts by weight, with respect to 100 parts by weight of the total amount of monomers used for emulsion polymerization.

In emulsion polymerization, it is possible to further use polymerization auxiliary materials such as a stabilizer, a dispersant, a pH adjuster, a deoxidizer, and a particle size adjuster as required. When these are used, the types and the amounts used thereof are not particularly limited.

Then, the carboxyl group-containing nitrile rubber (A) can be prepared by performing a hydrogenation reaction in which the double bonds of the conjugated diene monomer unit (a3) are selectively hydrogenated to the nitrile rubber in the latex of the obtained nitrile rubber.

Hydrogenation can be performed by any known method, such as an oil layer hydrogenation method in which latex of nitrile rubber obtained by emulsion polymerization is solidified, and then hydrogenated in an oil layer, or an aqueous layer hydrogenation method in which latex obtained by polymerization is directly hydrogenated. Among these, a water layer hydrogenation method is preferable.

When the nitrile rubber is hydrogenated by the aqueous hydrogenation method, it is preferable to dilute the latex of the nitrile rubber prepared by emulsion polymerization with water as required, to perform the hydrogenation reaction. The aqueous-layer hydrogenation method includes the aqueous-layer direct hydrogenation method in which hydrogen is supplied to the reaction system in the presence of a hydrogenation catalyst to hydrogenate, and the aqueous-layer indirect hydrogenation method in which hydrogenation is performed by reducing in the presence of an oxidizing agent, a reducing agent, and an active agent. However, the aqueous-layer direct hydrogenation method is more preferable.

The hydrogenation catalyst used may be any catalyst of a compound that is not appreciably decomposed by water; an example of such catalyst may be palladium catalysts, and the like.

Specific examples of palladium catalysts include palladium salts of carboxylic acids such as formic acid, acetic acid, propionic acid, lauric acid, succinic acid, oleic acid, and phthalic acid; palladium chlorides such as palladium chloride, dichloro(cyclooctadiene)palladium, dichloro(norbornadiene)palladium, and ammonium hexachloropalladate (IV); iodides such as palladium iodide; palladium sulfate-dihydrate, and the like. Among these, the palladium salts of carboxylic acids, dichloro(norbornadiene) palladium, and ammonium hexachloropalladate (IV) are particularly preferable.

The amount of the hydrogenation catalyst used may be determined as appropriate according to the type of hydrogenation catalyst used and the desired iodine value, but the amount of the palladium catalyst with respect to the nitrile rubber before hydrogenation is preferably 200 to 3000 weight ppm, and more preferably 300 to 2500 weight ppm.

The reaction temperature, hydrogen pressure, and reaction time in the aqueous layer direct hydrogenation method may be optionally determined according to the desired iodine value. The reaction temperature is preferably 30 to 70° C., more preferably 40 to 70° C., and particularly preferably 40 to 60° C. The hydrogen pressure is preferably 1 to 5 MPa and more preferably 2 to 4 MPa. The reaction time is preferably 4 to 8 hours, particularly preferably 5 to 8 hours.

The latex obtained in this manner after the hydrogenation reaction can be coagulated by salt analysis, filtered off, and dried to obtain a carboxyl group-containing nitrile rubber (A). In this case, each of the steps of filtration and drying following coagulation may be performed in a known manner.

<Polyamine-Based Crosslinking Agent (b)>

The crosslinkable rubber composition used in this embodiment contains a polyamine-based crosslinking agent (B) in addition to the carboxyl group-containing nitrile rubber (A) described above. The use of a polyamine-based crosslinking agent (B) as a crosslinking agent may further enhance the compression set resistance of the resultant rubber crosslinked product.

The polyamine-based crosslinking agent used is not particularly specified, and may be any polyamine-based crosslinking agent that is a compound having two or more amino groups or a compound becoming a form having two or more amino groups at the time of crosslinking; however, the polyamine-based crosslinking agent is preferably a compound having an aliphatic hydrocarbon or an aromatic hydrocarbon of which a plurality of hydrogen atoms are substituted with amino groups or with hydrazide structures (structures each represented by —CONHNH$_2$, where CO represents a carbonyl group), or a compound becoming the form of the aforementioned compound at the time of crosslinking.

Specific examples of the polyamine-based crosslinking agent (B) include aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; and the like. Among these, hexamethylmelamine carbamate is particularly preferable.

The content of the crosslinking agent in the crosslinkable rubber composition of the present embodiment is not particularly limited, but is preferably 0.1 to 20 parts by weight, more preferably 0.2 to 15 parts by weight, and still more preferably 0.5 to 10 parts by weight, with respect to 100 parts by weight of the carboxyl group-containing nitrile rubber (A). By setting the content of the polyamine-based crosslinking agent (B) within the above-mentioned range, it is possible to enhance the mechanical properties and the compression set resistance of the resultant rubber crosslinked product.

Note that the crosslinkable rubber composition of the present embodiment may be combined with a crosslinking agent other than a polyamine-based crosslinking agent (B), for example, a sulfur crosslinking agent or an organic peroxide crosslinking agent, to the extent that the effect of the present invention is not impaired.

Further, it is preferable that the crosslinkable rubber composition of this embodiment further includes a basic crosslinking accelerator. Further inclusion of the basic crosslinking accelerator further renders the present invention more effective.

Examples of the basic crosslinking accelerators having a cyclic amidine structure include 1,8-diazabicyclo[5,4,0]undecene-7 (hereinafter, sometimes abbreviated as "DBU"), 1,5-diazabicyclo[4.3.0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-triethylimidazoline, 1,4-dimethyl-2-ethylimidazoline, 1-methylphenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline; guanidine basic crosslinking accelerators such as tetramethylguanidine, tetraethylguanidine, tetraethylguanidine, 1,3-di-ortho-tolylguanidine, ortho-tolylbiguanide; aldehyde-based basic crosslinking accelerators such as n-butylaldehyde aniline, acetaldehyde ammonia; dicycloalkylamine such as dicyclopentylamine, dicyclohexylamine, dicycloheptylamine; secondary amine-based basic crosslinking accelerators such as N-methylcyclopentylamine, N-butylcyclopentylamine, N-heptylcyclopentylamine, N-heptylcyclopentylamine, N-octylpentylamine, N-ethylcyclohexylamine, N-heptylcyclohexylamine, N-octylcyclohexylamine, N-hydroxymethylcyclopentylamine, N-hydroxybutylcyclohexylamine, N-hydroxybutylcyclohexylamine Examples include N-methoxyethylcyclopentylamine, N-ethoxybutylcyclohexylamine, N-methoxybutylcyclopentylamine, N-methoxycarbonylcyclopentylamine, N-methoxycarbonylheptylcyclohexylamine, N-aminopropylcyclohexylamine, di(2-chlorocyclopentyl)amine, di(3-chlorocyclopentyl)amine, and the like. Among these, basic crosslinking accelerators having guanidine-based basic crosslinking accelerators, secondary amine-based basic crosslinking accelerators and cyclic amidine structures are preferable, 1,8-diazabicyclo[5,4,0]undecene-7 and 1,5-diazabicyclo[4,3,0]nonen-5 are more preferable, and 1,8-diazabicyclo[5,4,0]undecene-7 is particularly preferable. The basic crosslinking accelerator having the cyclic amidine structure may form salts with organic carboxylic acids, alkyl phosphates, and the like. The secondary amine-based basic crosslinking accelerator may also be a mixture of alcohols, such as alkylene glycols and alkyl alcohols having 5 to 20 carbon atoms, and may also contain inorganic acids and/or organic acids. The secondary amine-based basic crosslinking accelerator and the inorganic and/or organic acids may then form salts and may further form a complex with the alkylene glycol.

The content of the basic crosslinking accelerators in the crosslinkable rubber composition of the present embodiment is not particularly limited, but is preferably 0.1 to 20 parts by weight, more preferably 0.2 to 15 parts by weight, and still more preferably 0.5 to 10 parts by weight, with respect to 100 parts by weight of the carboxyl group-containing nitrile rubber (A). By setting the content of the basic crosslinking accelerators within the above-mentioned range, it is possible to enhance the compression set resistance of the resultant rubber crosslinked product.

<Metal-Based Acceptor (C)>

As described above, a carboxyl group-containing nitrile rubber (A) includes a halogen or a halogen compound. The inventor has discovered that rubber crosslinked product obtained from a carboxyl group-containing nitrile rubber (A) containing a halogen or halogen compound tend to have interfacial detachment at an adhered portion when the obtained rubber crosslinked product adhered to metal is immersed in the LLC.

Hence, in the crosslinkable rubber composition used in this embodiment, the metal-based acid acceptor (C) is further mixed, in addition to the carboxyl group-containing nitrile rubber (A) and the polyamine-based crosslinking agent (B). By using such a metal-based acid acceptor (C) as an acid acceptor, the resultant rubber crosslinked product may maintain excellent metal adhesion after being immersed in LLC.

Metal-based acid acceptors (C) are not particularly specified but may be any metal-based acid acceptors that can capture or neutralize halogens or halogen compounds contained in the carboxyl group-containing nitrile rubber (A). Examples of the metal-based acid acceptors may include, for example, oxides of metals belonging to Group 2 of the Periodic Table; oxides of metals belonging to Group 12 of the Periodic Table; oxides of metals belonging to Group 13 of the Periodic Table; hydroxides of metals belonging to Group 13 of the Periodic Table; complex oxides of hydrotalcite, and the like.

Hydrotalcites are compounds represented by a general formula: $Mg_xAl_y(OH)_{2x-3y-2}CO_3 \cdot wH_2O$ (where x is a number from 1 to 10, y is a number from 1 to 5, and w is a real number), and more specifically includes compounds represented by following formulas: $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, and $Mg_3Al_2(OH)_{10}CO_3 \cdot 1.7H_2O$.

Specific examples of metal-based acid acceptors (C) include magnesium oxide, magnesium hydroxide, barium hydroxide, magnesium carbonate, barium carbonate, calcium oxide, calcium hydroxide, calcium silicate, calcium stearate, calcium phthalate, calcium phthalate, zinc stearate, zinc oxide, aluminum hydroxide, hydrotalcite, tin oxide, lead dioxide, dibasic lead phthalate, tin stearate, basic zinc phosphate, basic zinc sulfate, and tribasic lead sulfate. Among these, from the viewpoint of superior thermal stability without heavy metals as an environmental pollutant source, magnesium oxide, calcium hydroxide, zinc oxide, aluminum hydroxide, and hydrotalcite are preferable; and from the viewpoint of maintaining the Mooney viscosity of the resulting crosslinkable rubber composition and the compression set resistance of the crosslinked rubber, aluminum hydroxide and hydrotalcite are preferable, and aluminum hydroxide is particularly preferable. In addition, the metal-based acid acceptor (C) may be used alone as a single type, or may be used in combination as a plurality of types.

The amount of the metal-based acid acceptor (C) used is not particularly specified and may preferably be 0.1 to 20 parts by weight, more preferably 0.5 to 10 parts by weight, and more preferably 1 to 5 parts by weight, with respect to 100 parts by weight of the carboxyl group-containing nitrile rubber (A). If the amount of the metal-based acid acceptor (C) used is too small, the resultant rubber crosslinked product fail to maintain excellent metal adhesion after being immersed in LLC. If, however, the amount of the metal-based acid acceptor used is too large, the hardness of the rubber crosslinked product may become too high. In addition, when the amount of the metal-based acid acceptor used is increased, the polymer-Mooney viscosity of the crosslinkable rubber composition tends to increase and the compression set resistance tends to decrease.

The crosslinkable rubber composition according to the present embodiment may include, in addition of the above components, compounding agents commonly used in the field of rubber, such as, a reinforcing filler such as carbon black or silica, a non-reinforcing filler such as calcium carbonate or clay, a crosslinking accelerator other than a basic crosslinking accelerator, a crosslinking aid, a crosslinking inhibitor, an anti-aging agent, an antioxidant, a light stabilizer, an anti-scorching agent such as a primary amine, a silane coupling agent, a plasticizer, a processing aid, a slip agent, an adhesive, a lubricant, a flame retardant, a mold retardant, an acid acceptor (excluding a metal-based acid acceptor described above), an antistatic agent, a pigment, and the like.

The amounts of these compounding agents are not particularly restricted to the extent that these agents do not inhibit the purposes or effects of the present invention, and may be mixed in an amount suitable for the purposes of the combination. Specifically, when carbon black is compounded as a reinforcing filler, the type of carbon black (for example, types of HAF, FEF, SRF, MT, etc.) can be selected from the viewpoint of the elasticity, hardness, chemical resistance, and the like of the rubber crosslinked product, and the amount of these agents can be adjusted.

The plasticizer used is not particularly limited, and examples of plasticizer include a trimellitic acid-based plasticizer, a pyromellitic acid-based plasticizer, an ether ester-based plasticizer, a polyester-based plasticizer, a phthalic acid-based plasticizer, an adipic acid ester-based plasticizer, a phosphoric acid ester-based plasticizer, a sebacic acid ester-based plasticizer, an alkylsulfonic acid ester compound plasticizer, and an epoxidized vegetable oil-based plasticizer. Specific examples include tri-2-ethylhexyl trimellitate, trimellitic acid isononyl ester, trimellitic acid mixed, linear alkyl ester, dipentaerythritol ester, pyromellitic acid 2-ethylhexyl ester, polyether ester (molecular weight: approximately 300 to 5000), adipic acid bis[2-(2-butoxyethoxy)ethyl], dioctyl adipate, adipic acid-based polyester (molecular weight: approximately 300 to 5000), dioctyl phthalate, diisononyl phthalate, dibutyl phthalate, tricresyl phosphate, dibutyl sebacate, alkylsulfonic acid phenyl ester, epoxidized soybean oil, diheptanoate, di-2-ethyl hexanoate, didecanoate, and the like. These may be used alone as a single type, or may be used in combination as a plurality of types.

Further, the crosslinkable rubber composition of this embodiment may further include polymers other than the above-mentioned carboxyl group-containing nitrile rubber (A) within a range of not impairing the effect of the present invention. Other polymers include acrylic rubber, ethylene-acrylic acid copolymer rubber, fluorine rubber, styrene-butadiene copolymer rubber, ethylene-propylene copolymer rubber, ethylene-propylene-diene terpolymer rubber, natural rubber, and polyisoprene rubber. The amounts of other polymers added in the crosslinkable rubber composition are preferably 30 parts by weight or less, more preferably 20 parts by weight or less, more preferably 10 parts by weight or less, with respect to 100 parts by weight of the carboxyl group-containing nitrile rubber (A).

The crosslinkable rubber composition of the present invention is prepared by mixing the above-mentioned components preferably in a non-aqueous system. The method of preparing the crosslinkable rubber composition according to the present embodiment is not limited; however, the polyamine-based crosslinking agent (B) and the components excluding a thermally unstable crosslinking aid can be first kneaded with a mixer such as a Banbury mixer, an intermixer, a kneader, etc., and transferring the components to a roll, etc., to be secondly kneaded with added a polyamine-based crosslinking agent (B) and a thermally unstable crosslinking aid, etc.

The polymer-Mooney viscosity (ML1+4, 100° C.) of the crosslinkable rubber composition of this embodiment is preferably 10 to 200, more preferably 15 to 150, still more preferably 20 to 120, and particularly preferably 30 to 100, in view of processability.

<Rubber Crosslinked Product>

The rubber crosslinked product of the present invention is obtained by crosslinking the above crosslinkable rubber composition of the present invention.

For example, the crosslinkable rubber composition of the present embodiment is molded by a molding machine corresponding to a desired shape, such as an extruder, an injection molding machine, a compressor, a roll, and the like, heated to cause crosslinking reaction, and fixing the shape as a crosslinked product. In this case, the crosslinkable rubber composition molded in advance may be subsequently crosslinked, or may be crosslinked simultaneously with being molded. The forming temperature is usually 10 to 200° C., and preferably 25 to 120° C. The crosslinking temperature is usually 100 to 200° C. and preferably 130 to 190° C., and the crosslinking time is usually 1 minute to 1 hour and preferably 2 minutes to 30 minutes.

Further, depending on the shape, size, etc. of the crosslinked product, even if the surface is crosslinked, the internal part may not be sufficiently crosslinked; in such a case, it is possible to further heat the rubber for secondary crosslinking.

As the heating method, a method commonly-used for crosslinking rubber may be appropriately selected; examples of such heating method include press heating, steam heating, oven heating, and hot air heating.

The thus obtained crosslinked rubber of the present embodiment particularly exhibits excellent compression set resistance.

<Complex>

The complex according to the embodiment of the present embodiment is a rubber-metal complex containing the above rubber crosslinked product of the present embodiment and a metal. Examples of the metal forming the complex of the present embodiment include, but not particularly limited to, metal materials such as iron, stainless steel, steel, aluminum, copper, brass and the like.

The method for producing a complex of this embodiment includes, but is not particularly limited to, the following method, for example. That is, first, the above-described metallic material (for example, a metal plate) is prepared, and a surface to be adhered to the rubber crosslinked product is roughened by shot blasting, polishing, hairline finishing, dull finishing or the like.

Subsequently, an adhesive layer is formed on the roughened adhesive surface of the metal material. The adhesive layer can be formed by using a known adhesive, for example, a chlorine rubber type adhesive, a polyolefin type adhesive, a synthetic resin type adhesive such as a phenol resin type adhesive. Specifically, such an adhesive is applied to the adhesive surface of the metal material by a brush coating method, a dipping method, a spraying method, a spraying method, a roll coating method, or the like, and is then dried at room temperature or warm air. Thereafter, the adhesive layer can be formed by baking at a temperature of 100 to 250° C. for 10 to 30 minutes as required. To form an adhesive layer, a primer layer may be formed on an adhesive layer forming surface of the metal material in advance, and an adhesive layer may be formed thereafter. This primer layer may be formed in place of the roughening treatment of the metal material as required.

Next, the rubber molded body is prepared by molding the crosslinkable rubber composition of the present embodiment described above into a desired shape. The rubber mold can be obtained by molding the crosslinkable rubber composition of the embodiment described above in a conventional molding process such as extrusion, injection molding, transfer molding, compression molding, or the like.

For example, when an extrusion method is employed, a crosslinkable rubber composition prepared by roll mixing or the like may be fed to the feed port of the extruder, softened by heating from the barrel during the process of feeding to the head by screws, and passed through a predetermined shape die on the head portion to yield an elongated extruded article having a desired cross-sectional shape. The resultant extruded article may then be cut into a predetermined size and shape to obtain a rubber mold.

The resultant rubber mold and the metal material are then laminated via an adhesive layer to form a laminate, and heated to 130 to 220° C. and more preferably 140 to 200° C. in an oven using electricity, hot air, steam, or the like as a heat source, which allows the rubber mold and the metal material to be crosslinked and bonded to each other. As a result, a rubber-metal complex composed of the rubber crosslinked product and the metal according to the present exemplary embodiment may be obtained.

To crosslink and adhere the rubber crosslinked product and the metal material, a method in which a rubber molded body and a metal material having an adhesive layer formed in advance are compression molded in a mold using a press molding machine, as required, and then heated and molded may be adopted. Further, as required, secondary crosslinking may be performed by heating in an oven or the like using electricity, hot air, steam or the like as a heat source at 130 to 220° C., and more preferably 140 to 200° C. for 1 to 48 hours.

The complex is not restricted to a rubber-metal complex including the above rubber crosslinked product and a metal, and the complex may be obtained by further crosslinking the rubber crosslinked product and other materials (for example, a thermoplastic resin other than rubber, ceramic, etc.) as a combined complex (e.g., rubber-metal-ceramic complex).

Since the complex of the present embodiment is obtained using the crosslinkable rubber composition according to the above-described embodiment, a rubber layer adhered to the metal exhibits excellent compression set resistance and metal adhesion, and maintains excellent metal adhesion after being immersed in LLC. Accordingly, the complex of the present embodiment can be suitably used in a wide range of applications, such as radiator caps for automobiles and machine tools, rubber-coated metal gaskets, oil seals, vibration insulating rubber, water pump seals, mechanical seals, and the like.

EXAMPLES

The following illustrates embodiments of the present invention specifically by way of Examples and Comparative Examples. Tests and evaluation methods for physical properties and characteristics are as follows. Unless otherwise stated, "parts" and "%" are by weight basis.

<Composition of Carboxyl Group-Containing Nitrile Rubber and Highly Saturated Nitrile Rubber>

The content of each monomer unit forming a carboxyl group-containing nitrile rubber was measured by the following method. That is, the content of the mono-n-butyl maleate unit was calculated as follows: 100 ml of 2-butanone was added to 0.2 g of a 2 mm square carboxyl group nitrile rubber, and the obtained solution was stirred for 4 hours. Then, 20 ml of ethanol and 10 ml of water was added, and titration was performed, while stirring, at room temperature by using a 0.02N aqueous ethanol solution of potassium hydroxide and thymolphthalein as an indicator to measure the number of moles of the carboxyl group with respect to 100 g of the nitrile rubber containing the carboxyl group. The obtained number of moles was then converted into the amount of mono-n-butyl maleate unit.

The content of 1,3-butadiene unit and butadiene hydride unit was calculated by measuring iodine value (in accordance with JIS K6235) using nitrile rubber before hydrogenation. The content of acrylonitrile units was calculated by measuring the nitrogen content in the carboxyl group-containing nitrile rubber by the Kjeldahl method in accordance with JIS K6383. The content of 2-methoxyethyl acrylate and n-butyl acrylate was calculated as remaining components with respect to each monomer unit.

<Iodine Value>

The iodine values of carboxyl group-containing nitrile rubber and other highly saturated nitrile rubber (hereinafter collectively referred to as "polymers") were measured in accordance with JIS K6235.

<Polymer Mooney Viscosity and Mooney Viscosity of Crosslinkable Rubber Compositions>

A Mooney viscosity (polymer-Mooney viscosity) of the carboxyl group-containing nitrile rubber and other highly saturated nitrile rubber (ML1+4, 100° C.) and the Mooney viscosity (ML1+4, 100° C.) of the crosslinkable rubber composition containing each polymer were measured in accordance with JIS K6300. The Mooney viscosity is one of the indices for evaluating the processability, and the like of carboxyl group-containing nitrile rubber, other highly saturated nitrile rubber, and crosslinkable rubber compositions. According to the Mooney viscosity, the smaller the value, the better the processability.

<Chlorine Content (Residual Chlorine)>

1 g of polymer was dissolved in 150 ml of a mixture of methyl ethyl ketone and isopropanol in a 4:1 volume ratio, and 2% dilute sulfuric acid was further added to prepare a sample solution. The chlorine content (residual chlorine content) was calculated by titrating the obtained sample solution with 0.005 N mercury nitrate solution.

<Compression Set Resistance>

Using a mold having an inner diameter of 30 mm and a ring diameter of 3 mm, a crosslinkable rubber composition was crosslinked at a temperature of 170° C. for 20 minutes under a pressing pressure of 10 MPa. Thereafter, secondary crosslinking was performed at 170° C. for 4 hours to obtain an O-ring shaped test piece. Using the obtained O-ring shaped test piece, the compression set resistance was measured in accordance with JIS K6262 under the condition where the O-ring shaped test piece sandwiched between two planar surfaces was placed in an environment of 150° C. for 168 hours while the distance between two planar surfaces sandwiching an O-ring shaped test piece was compressed by 25% in the ring thickness direction. Compression set resistance is one of the indices for evaluating the sealability of rubber crosslinked product, and the smaller this value, the better the compression set resistance.

<Metal Adhesion>

First, using a crosslinkable rubber composition, a laminate sample in which a rubber layer and a metal layer were crosslinked and adhered via an adhesive layer was produced by the following method.

Specifically, a 3 mm×25 mm×60 mm metal plate was prepared, the surface of the metal plate was roughened using a 320 mesh sandpaper, and the surface of the roughened metal plate was washed using toluene and acetone. Stainless steel (SUS304) was used as a metal plate.

The adhesive was then applied to a surface of the roughened metal plate, allowed to stand for 30 minutes, and air-dried; the obtained metal plate was then heated in an oven at a temperature of 150° C. for 20 minutes, and baked; as a result an adhesive layer was thus formed. As the adhesive forming the adhesive layer, a phenol resin adhesive (trade name "METALOCK N-10", made by Toyo Kagaku Kenkyusho Co., Ltd., "METALOCK is registered trademark) was used.

Subsequently, a sheet of a crosslinkable rubber composition of 2.5 mm×25 mm×125 mm was placed on the metal plate having the adhesive layer formed thereon to obtain a laminate before being crosslinked. This uncrosslinked laminate was placed in a mold of 5 mm×25 mm×125 mm, and heated and compressed under a pressure of 10 MPa and a temperature of 170° C. for 20 minutes by a press molding machine, and secondary crosslinking was then carried out at 170° C. for 4 hours; a laminate sample for metal adhesion test (contact area between rubber and metal plate was 25 mm×40 mm) was thus obtained.

A 90 degree peeling test was carried out in accordance with JIS K6256 using the laminate sample for metal adhesion test. Metal adhesion was evaluated according to the following criteria by determining the fracture rate of the rubber layer at the time of performing 90 degree peeling test. Note that, "GOOD" was evaluated as acceptable, "FAIR" as practically acceptable, and "NO GOOD" as practically unacceptable.

GOOD: Ratio of fracture of the rubber layer is 90% or more
FAIR: Ratio of fracture of rubber layer is 50% or more and less than 90%
NO GOOD: Ratio of fracture of rubber layer is less than 50%

<Metal Adhesion After Being Immersed in LLC>

In a hermetically sealed container, a laminate sample for metal adhesion test prepared under the same conditions as the metal adhesion test described above was immersed in a mixture (LLC) of 1:1 volume of monoethylene glycol and distilled water and heated in an oven at 120° C. for 72 hours. After heating, the laminate sample was removed from the oven, and subjected to a peeling test (a 90 degree peeling test in accordance with JIS K6256) under the same conditions as the above-described metal adhesion test, and the metal adhesion after being immersed in LLC was evaluated.

PRODUCTION EXAMPLES, EXAMPLES AND COMPARATIVE EXAMPLES (Production Example 1) Production of a Carboxyl Group-Containing Highly Saturated Nitrile Rubber (A-1)

In a metal bottle, 180 parts of ion exchanged water, 25 parts of an aqueous solution of sodium dodecylbenzenesulfonate solution having a concentration of 10%, 37 parts of acrylonitrile, 6 parts of mono-n-butyl maleate, and 0.75 parts of t-dodecyl mercaptan (molecular weight adjuster)

were placed in this order, and the gas inside the metal bottle was replaced with nitrogen three times, and then 57 parts of 1,3-butadiene were placed in the metal bottle.

The metal bottle was kept at 5° C., 0.1 parts of cumene hydroperoxide (polymerization initiator) were placed in the metal bottle, and polymerization reaction was performed for 16 hours while the metal bottle was being rotated. Subsequently, 0.1 parts of an aqueous solution of hydroquinone (polymerization terminator) having a concentration of 10% was added to terminate the polymerization reaction, and the residual monomers were subsequently removed by using a rotary evaporator at a water temperature of 60° C.; a latex (solid content concentration: approximately 30 wt %) of an acrylonitrile-butadiene-mono-n-butyl maleate copolymer rubber was thus obtained.

Then, in an autoclave, the latex obtained as described above and a palladium catalyst (a solution prepared by mixing a 1% palladium acetone solution and an equal weight of ion exchanged water) were added such that the content of palladium was 2000 ppm by weight with respect to the dry weight of the rubber contained in the latex obtained as described above. Thereafter, a hydrogenation reaction was performed at a hydrogen pressure of 3 MPa and a temperature of 50° C. for 6 hours. A latex of a carboxyl group-containing highly saturated nitrile rubber (A-1) was thus obtained.

Subsequently, the resulting carboxyl group-containing highly saturated nitrile rubber latex was coagulated. Specifically, the above-obtained latex was slowly poured into a tank prepared with an aqueous sodium chloride solution (concentration: 25%) as a coagulant, which was then vigorously stirred and mixed to coagulate the latex (salt coagulated). The carboxyl group-containing highly saturated nitrile rubber after coagulation was filtered to remove a solid (crumb), and vacuum dried at 60° C. for 12 hours, thereby obtaining the carboxyl group-containing highly saturated nitrile rubber (A-1).

The obtained carboxyl group-containing highly saturated nitrile rubber (A-1) had an iodine value of 10, a carboxyl group content of $3.2 \times 10^{-2}$ ephr, a polymer-Mooney viscosity (ML1+4, 100° C.) of 45, and residual chlorine of 4800 ppm.

The content of acrylonitrile units was determined by the Kjeldahl method, the content of mono-n-butyl maleate was determined from the content of the carboxyl group, and the remainder was calculated as 1,3-butadiene unit. The obtained composition of the carboxyl group-containing highly saturated nitrile rubber (A-1) included 35.6 wt % of acrylonitrile unit, 58.8 wt % of butadiene unit (including hydrogenated fraction), and 5.6 wt % mono-n-butyl maleate unit.

(Production Example 2) Production of a Carboxyl Group-Containing Highly Saturated Nitrile Rubber (A-2)

A carboxyl group-containing highly saturated nitrile rubber (A-2) was obtained in the same manner as in Production Example 1 except that the amount of acrylonitrile was altered to 45 parts, the amount of mono-n-butyl maleate was altered to 6 parts, and the amount of 1,3-butadiene was altered to 49 parts. The obtained carboxyl group-containing highly saturated nitrile rubber (A-2) consisted, of 45.4 wt % of the acrylonitrile unit, 49.7 wt % of the butadiene unit (including the hydrogenated fraction), and 4.9 wt % of the mono-n-butyl maleate unit. The obtained carboxyl group-containing highly saturated nitrile rubber (A-2) had an iodine value of 9, a carboxyl group content of $3.0 \times 10^{-2}$ ephr, a polymer-Mooney viscosity (ML1+4, 100° C.) of 40, and residual chlorine of 4900 ppm.

(Production Example 3) Production of a Carboxyl Group-Containing Highly Saturated Nitrile Rubber (A-3)

A carboxyl group-containing highly saturated nitrile rubber (A-3) was obtained in the same manner as in Production Example 1 except that the amount of acrylonitrile was altered to 23 parts, the amount of mono-n-butyl maleate was altered to 6.5 parts, and the amount of 1,3-butadiene was altered to 40 parts, and further 30.5 parts of 2-methoxyethyl acrylate was added. The obtained carboxyl group-containing highly saturated nitrile rubber (A-3) consisted of 24.0 wt % of acrylonitrile unit, 46.6 wt % of the butadiene unit (including the hydrogenated fraction), 6.5 wt % of mono-n-butyl maleate unit, and 22.9 wt % of the 2-methoxyethyl acrylate unit. The obtained carboxyl group-containing highly saturated nitrile rubber (A-3) had an iodine value of 10, a carboxyl group content of $3.7 \times 10^{-2}$ ephr, a polymer-Mooney viscosity (ML1+4, 100° C.) of 48, and residual chlorine of 5000 ppm.

(Production Example 4) Production of a Carboxyl Group-Containing Highly Saturated Nitrile Rubber (A-4)

A carboxyl group-containing highly saturated nitrile rubber (A-4) was obtained in the same manner as in Production Example 1 except that the amount of acrylonitrile was altered to 21 parts, the amount of mono-n-butyl maleate was altered to 5 parts, and the amount of 1,3-butadiene was altered to 44 parts, and further 30 parts of n-butyl acrylate was added. The obtained carboxyl group-containing highly saturated nitrile rubber (A-4) consisted of 20.8 wt % of the acrylonitrile unit, 44.2 wt % of the butadiene unit (including the hydrogenated fraction), 4.9 wt % of mono-n-butyl maleate unit, and 30.1 wt % of the n-butyl acrylate unit. The obtained carboxyl group-containing highly saturated nitrile rubber (A-4) had an iodine value of 10, a carboxyl group content of $2.8 \times 10^{-2}$ ephr, a polymer-Mooney viscosity (ML1+4, 100° C.) of 48, and residual chlorine of 4900 ppm.

(Production Example 5) Production of a Carboxyl Group-Containing Highly Saturated Nitrile Rubber (A-5)

A carboxyl group-containing highly saturated nitrile rubber (A-5) was obtained in the same manner as in Production Example 1 except that the amount of acrylonitrile was altered to 15 parts, the amount of mono-n-butyl maleate was altered to 5 parts, and the amount of 1,3-butadiene was altered to 43 parts, and further 37 parts of n-butyl acrylate was added. The obtained carboxyl group-containing highly saturated nitrile rubber (A-5) consisted of 15.4 wt % of the acrylonitrile unit, 43.5 wt % of the butadiene unit (including the hydrogenated fraction), 5 wt % of mono-n-butyl maleate unit, and 36.1 wt % of the n-butyl acrylate unit. The obtained carboxyl group-containing highly saturated nitrile rubber (A-5) had an iodine value of 10, a carboxyl group content of $2.9 \times 10^{-2}$ ephr, a polymer-Mooney viscosity (ML1+4, 100° C.) of 40, and residual chlorine of 4800 ppm.

(Production Example 6) Production of Highly Saturated Nitrile Rubber (A-6)

In a reactor, 200 parts of ion exchanged water, and 2.25 parts of a fatty acid potassium soap (a potassium salt of a fatty acid) were added to prepare a soap aqueous solution. Then, in the soap aqueous solution, 37 parts of acrylonitrile and 0.5 parts of t-dodecyl mercaptan (molecular weight adjuster) were placed in this order, the gas inside the reactor was replaced with nitrogen three times, and then 63 parts of 1,3-butadiene was placed in the reactor. Subsequently, the reactor was kept at 5° C., 0.1 parts of cumene hydroperoxide (polymerization initiator) were placed in the reactor, and the polymerization reaction was performed for 16 hours while the reaction mixture in the reactor was being stirred. Subsequently, 0.1 parts of an aqueous solution of hydroquinone (polymerization terminator) having a concentration of 10% were added to terminate the polymerization reaction, and the residual monomers were removed by using a rotary evaporator at a water temperature of 60° C., to obtain a latex (solid content concentration: approximately 25 wt %) of a nitrile rubber.

Subsequently, the latex obtained as described above was added to an aqueous solution of aluminum sulfate in an amount of 3 wt % with respect to the weight of the nitrile rubber contained in the latex, the resulting mixture was stirred to coagulate the latex, the coagulated latex was filtered off while being washed with water, and then coagulated latex was vacuum dried at 60° C. for 12 hours to obtain a nitrile rubber. Then, the obtained nitrile rubber was dissolved in acetone for the concentration to be 12%, the resulting solution was placed in an autoclave, a palladium-silica catalyst was added to the solution in an amount of 500 weight ppm with respect to the nitrile rubber, and the hydrogenation reaction was performed at a hydrogen pressure of 3 MPa and a temperature of 50° C. After the completion of the hydrogenation reaction, the reaction mixture was poured into a large amount of water to coagulate the reaction product, and the reaction product was filtered off and dried, to obtain a highly saturated nitrile rubber (A-6). The highly saturated nitrile rubber (A-6) consisted of 36.2 wt % of the acrylonitrile unit and 63.8 wt % of the 1,3-butadiene unit (including the hydrogenated fraction). The obtained highly saturated nitrile rubber (A-6) had an iodine value of 8, and a polymer-Mooney viscosity [ML1+4, 100° C.] of 85, and residual chlorine of 80 ppm.

Using the obtained carboxyl group-containing highly saturated nitrile rubbers (A-1) to (A-5) and highly saturated nitrile rubber (A-6), a crosslinkable rubber composition was prepared as illustrated in examples 1 to 28 and in comparative examples 1 to 3.

Example 1

By using a Banbury mixer, the following ingredients were added to and mixed with 100 parts of the carboxyl group-containing highly saturated nitrile rubber (A-1) obtained in Production Example 1: 20 parts of an FEF carbon black (trade name "Seast SO", made by Tokai Carbon Co., Ltd.), 5 parts of tri-2-ethylhexyl trimellitate (trade name "ADK Cizer C-8", made by ADEKA Corporation, plasticizer), 1.5 parts of 4,4'-di-(α,α'-dimethylbenzyl) diphenylamine (trade name "Naugard 445", made by Crompton Corporation, "Naugard" is a registered trademark, antiaging agent) and 1 part of stearic acid (processing aid), and 1 part of polyoxyethylene alkyl ether phosphoric acid ester (trade name "Phosphanol RL210", made by Kao Corporation, "Phosphanol" is registered trademark, processing aid).

Next, the obtained mixture was transferred to a roll, 2.4 parts of hexamethylenediamine carbamate (trade name "Diak #1", made by Du Pont Dow Elastomer Corporation, polyamine-based crosslinking agent belonging to aliphatic polyvalent amines), 4 parts of 1,8-diazabicyclo[5.4.0]undecene-7 (DBU) (tradename "RHENOGRAN XLA-60", made by Rhein Chemie Corporation; a product of 60% of DBU (including a fraction being zinc dialkyldiphosphate salt), a basic crosslinking accelerator), and 0.5 parts of aluminum hydroxide (trade name "KYOWAAD 200S", made by Kyowa Chemical Industry Co., Ltd., "KYOWAAD" is registered trademark, a metal-based acid acceptor) were added to the mixture, and the mixture was kneaded to obtain a nitrile rubber composition.

Using the obtained crosslinkable rubber composition, the polymer-Mooney viscosity, compression set resistance, metal adhesion before being immersed in LLC, and metal adhesion after being immersed in LLC were evaluated with respect to the crosslinkable rubber composition in accordance with the above-described methods. The results thus obtained are shown in Table 1.

Examples 2 to 5

Crosslinkable rubber compositions were prepared and evaluated in the same manner as in Example 1 except that the amount of aluminum hydroxide added was altered to 1 part, 3 parts, 5 parts, and 10 parts, respectively. The results thus obtained are shown in Table 1.

Examples 6 to 9

Crosslinkable rubber composition were prepared and evaluated in the same manner as in Example 3 except that hydrotalcite (trade name "DHT-4A", made by Kyowa Chemical Industry Co., Ltd.), magnesium oxide (trade name "Kyowa Mag 30", made by Kyowa Chemical Industry Co., Ltd. "Kyowa Magu" is registered trademark), zinc oxide (trade name "Zinc oxide 2 types", made by Tadashi Kagaku Kogyo Co., Ltd.), and calcium hydroxide (trade name "CALDIC 2000", made by Ohmi Chemical Industry Co., Ltd. "CALDIC" is registered trademark) were added instead of aluminum hydroxide, respectively. The results thus obtained are shown in Table 1.

Example 10

A crosslinkable rubber composition was prepared and evaluated in the same manner as in Example 3 except that the carboxyl group-containing highly saturated nitrile rubber (A-2) obtained in Production Example 2 was used and the addition amount of hexamethylenediamine carbamate was altered to 2 parts. The results thus obtained are shown in Table 1. The addition amount of hexamethylenediamine carbamate was altered because the amount of carboxylic acid that reaches a crosslinking point differs between Production Example 1 and Production Example 2, and the amount of crosslinking agent to be added needed to be adjusted accordingly.

Example 11

A crosslinkable rubber composition was prepared and evaluated in the same manner as in Example 3 except that the carboxyl group-containing highly saturated nitrile rubber (A-3) obtained in Production Example 3 was used, the addition amount of FEF carbon black was altered to 22.5 parts, and the addition amount of hexamethylenediamine carbamate was altered to 2.7 parts. The results thus obtained are shown in Table 1. The addition amount of FEF carbon black was altered because the hardness of crosslinked rubber resulting from different amounts of acrylonitrile being used differs between Production Example 1 and Production Example 3, and the amount of FEF carbon black to be added thus needed to be adjusted accordingly. The addition amount of hexamethylenediamine carbamate was altered because the amount of carboxylic acid that reaches a crosslinking point differs between Production Example 1 and Production Example 3, and the amount of crosslinking agent to be added needs to be adjusted accordingly.

Example 12

A crosslinkable rubber composition was prepared and evaluated in the same manner as in Example 3 except that the carboxyl group-containing highly saturated nitrile rubber (A-4) obtained in Production Example 4 was used, the addition amount of FEF carbon black was altered to 25 parts, and the addition amount of hexamethylenediamine carbamate was altered to 1.9 parts. The results thus obtained are shown in Table 1. The reason why addition amount of hexamethylenediamine carbamate was altered was the same as the reason for changing the addition amount of hexamethylenediamine carbamate in Example 11. The addition amount of FEF carbon black was altered because the hardness of crosslinked rubber resulting from different amounts of acrylonitrile being used differs between Production Example 3 and Production Example 4, and the amount of FEF carbon black to be added thus needed to be adjusted accordingly.

Example 13

A crosslinkable rubber composition was prepared and evaluated in the same manner as in Example 12 except that the carboxyl group-containing highly saturated nitrile rubber (A-5) obtained in Production Example 5 was used and the addition amount of hexamethylenediamine carbamate was altered to 2.1 parts. The results thus obtained are shown in Table 1.

Example 14

A crosslinkable rubber composition was prepared and evaluated in the same manner as in Example 3 except that in place of FEF carbon black, 20 parts of silica (trade name "Nipsil ER", made by Tosoh-Silica Co., Ltd., "Nipsil" is registered trademark), and γ-aminopropyltriethoxysilane (trade name "DOW CORNING TORAY Z-6011", trade name "DOW CORNING TORAY Z-6011", made by Dow Corning Toray Silane coupling agent) were added. The results thus obtained are shown in Table 1.

Example 15

A crosslinkable rubber composition was prepared and evaluated in the same manner as in Example 14 except that the carboxyl group-containing highly saturated nitrile rubber (A-2) obtained in Production Example 2 was used and the addition amount of hexamethylenediamine carbamate was altered to 2 parts. The results thus obtained are shown in Table 1.

Example 16

A crosslinkable rubber composition was prepared and evaluated in the same manner as in Example 14 except that the carboxyl group-containing highly saturated nitrile rubber (A-3) obtained in Production Example 3 was used, the addition amount of silica was altered to 22.5 parts, and the addition amount of hexamethylenediamine carbamate was altered to 2.7 parts. The results thus obtained are shown in Table 1. The reason why the addition amount of silica was altered was the same as the reason for changing the addition amount of carbon black in Example 11.

Example 17

A crosslinkable rubber composition was prepared and evaluated in the same manner as in Example 14 except that the carboxyl group-containing highly saturated nitrile rubber (A-4) obtained in Production Example 4 was used, the addition amount of silica was altered to 25 parts, and the addition amount of hexamethylenediamine carbamate was altered to 1.9 parts. The results thus obtained are shown in Table 1. The reason why the addition amount of silica was altered was the same as the reason for changing the addition amount of carbon black in Example 12.

Example 18

A crosslinkable rubber composition was prepared and evaluated in the same manner as in Example 17 except that the carboxyl group-containing highly saturated nitrile rubber (A-5) obtained in Production Example 5 was used and the addition amount of hexamethylenediamine carbamate was altered to 2.1 parts. The results thus obtained are shown in Table 1.

Example 19

A crosslinkable rubber composition was prepared and evaluated in the same manner as in Example 3 except that HAF carbon black (trade name "SEAST 3", made by Tokai Carbon Co., Ltd.) was used instead of FEF carbon black. The results thus obtained are shown in Table 2.

Example 20

A crosslinkable rubber composition was prepared and evaluated in the same manner as in Example 10 except that HAF carbon black was used instead of FEF carbon black. The results thus obtained are shown in Table 2.

Example 21

A crosslinkable rubber composition was prepared and evaluated in the same manner as in Example 11 except that HAF carbon black was used instead of FEF carbon black. The results thus obtained are shown in Table 2.

Example 22

A crosslinkable rubber composition was prepared and evaluated in the same manner as in Example 12 except that the carboxyl group-containing highly saturated nitrile rubber (A-4) obtained in Production Example 4 was used and HAF carbon black was used instead of FEF carbon black. The results thus obtained are shown in Table 2.

Example 23

A crosslinkable rubber composition was prepared and evaluated in the same manner as in Example 13 except that HAF carbon black was used instead of FEF carbon black. The results thus obtained are shown in Table 2.

Example 24

A crosslinkable rubber composition was prepared and evaluated in the same manner as in Example 3 except that the addition amount of FEF carbon black was altered to 10 parts, and 20 parts of MT carbon black (trade name "THERMAX N990", made by Cancarb, "THERMAX" was registered trademark) were further added. The results thus obtained are shown in Table 2.

Example 25

A crosslinkable rubber composition was prepared and evaluated in the same manner as in Example 10 except that the addition amount of FEF carbon black was altered to 10 parts, and 20 parts of MT carbon black were further added. The results thus obtained are shown in Table 2.

Example 26

A crosslinkable rubber composition was prepared and evaluated in the same manner as in Example 11 except that the addition amount of FEF carbon black was altered to 10 parts, and 25 parts of MT carbon black were further added. The results thus obtained are shown in Table 2.

Example 27

A crosslinkable rubber composition was prepared and evaluated in the same manner as in Example 12 except that the addition amount of FEF carbon black was altered to 12.5 parts, and 25 parts of MT carbon black were further added. The results thus obtained are shown in Table 2.

Example 28

A crosslinkable rubber composition was prepared and evaluated in the same manner as in Example 13 except that the carboxyl group-containing highly saturated nitrile rubber (A-5) obtained in Production Example 5 was used, the addition amount of FEF carbon black was altered to 12.5 parts, and 25 parts of MT carbon black were further added. The results thus obtained are shown in Table 2.

Comparative Example 1

A crosslinkable rubber composition was prepared and evaluated in the same manner as in Example 1 except that aluminum hydroxide was not added. The results thus obtained are shown in Table 2.

Comparative Example 2

A crosslinkable rubber composition was prepared and evaluated in the same manner as in Example 1 except that the highly saturated nitrile rubber (A-6) obtained in Production Example 6 was used; each of the following polyoxyethylene alkyl ether phosphate ester, hexamethylene diamine carbamate, 1,8-diazabicyclo[5.4.0]undecene-7 (DBU), and aluminum hydroxide were not added, and 8 parts of 1,3-bis(t-butylperoxyisopropyl)benzene (40% product) was added. The results thus obtained are shown in Table 2.

Comparative Example 3

A crosslinkable rubber composition was prepared and evaluated in the same manner as in Comparative Example 2 except that aluminum hydroxide was added. The results thus obtained are shown in Table 2.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Composition of nitrile rubber composition | | | | | | | | | | | |
| Carboxyl group-containing highly saturated nitrile rubber (A-1) | (parts) | 100 | 100 | 100 | 100 | 100 | 100 | 100 | 100 | 100 | |
| Carboxyl group-containing highly saturated nitrile rubber (A-2) | (parts) | | | | | | | | | | 100 |
| Carboxyl group-containing highly saturated nitrile rubber (A-3) | (parts) | | | | | | | | | | |
| Carboxyl group-containing highly saturated nitrile rubber (A-4) | (parts) | | | | | | | | | | |
| Carboxyl group-containing highly saturated nitrile rubber (A-5) | (parts) | | | | | | | | | | |
| Highly saturated nitrile rubber (A-6) | (parts) | | | | | | | | | | |
| FEF Carbon black | (parts) | 20 | 20 | 20 | 20 | 20 | 20 | 20 | 20 | 20 | 20 |
| HAF Carbon black | (parts) | | | | | | | | | | |
| MT Carbon black | (parts) | | | | | | | | | | |
| Silica | (parts) | | | | | | | | | | |
| Tri-2-ethylhexyl trimellitate | (parts) | 5 | 5 | 5 | 5 | 5 | 5 | 5 | 5 | 5 | 5 |
| 4,4'-Di-(α,α-dimethylbenzyl)diphenylamine | (parts) | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 |
| Polyoxyethylenealkylether phosphoric acid ester | (parts) | 1 | 1 | 1 | 1 | 1 | 1 | 1 | 1 | 1 | 1 |
| Silane coupling agent | (parts) | | | | | | | | | | |
| Hexamethylenediamine carbamate | (parts) | 2.4 | 2.4 | 2.4 | 2.4 | 2.4 | 2.4 | 2.4 | 2.4 | 2.4 | 2 |
| 1,8-Diazabicyclo[5,4,0]-undecene-7, 60% product | (parts) | 4 | 4 | 4 | 4 | 4 | 4 | 4 | 4 | 4 | 4 |
| 1,3-Bis(t-butylperoxyisopropylbenzene), 40% product | (parts) | | | | | | | | | | |
| Aluminum hydroxide | (parts) | 0.5 | 1 | 3 | 5 | 10 | | | | | 3 |
| Hydrotalcite | (parts) | | | | | | 3 | | | | |
| Magnesium oxide | (parts) | | | | | | | 3 | | | |
| Zinc hydroxide | (parts) | | | | | | | | 3 | | |
| Calcium hydroxide | (parts) | | | | | | | | | 3 | |

TABLE 1-continued

| Evaluations of crosslinkable rubber composition Processability | | | | | | | | | | | |
|---|---|---|---|---|---|---|---|---|---|---|---|
| Mooney viscosity | | 81 | 83 | 88 | 95 | 110 | 85 | 97 | 103 | 94 | 83 |
| Sealability | | | | | | | | | | | |
| Compression set resistance | (%) | 42 | 40 | 38 | 40 | 45 | 36 | 42 | 48 | 48 | 41 |
| Metal adhesion | | | | | | | | | | | |
| Before immersed in LLC | | G | G | G | G | G | G | G | G | G | G |
| After immersed in LLC | | F | G | G | G | G | G | G | G | G | G |

| | | Example | | | | | | | |
|---|---|---|---|---|---|---|---|---|---|
| | | 11 | 12 | 13 | 14 | 15 | 16 | 17 | 18 |
| Composition of nitrile rubber composition | | | | | | | | | |
| Carboxyl group-containing highly saturated nitrile rubber (A-1) | (parts) | | | | 100 | | | | |
| Carboxyl group-containing highly saturated nitrile rubber (A-2) | (parts) | | | | | 100 | | | |
| Carboxyl group-containing highly saturated nitrile rubber (A-3) | (parts) | 100 | | | | | 100 | | |
| Carboxyl group-containing highly saturated nitrile rubber (A-4) | (parts) | | 100 | | | | | 100 | |
| Carboxyl group-containing highly saturated nitrile rubber (A-5) | (parts) | | | 100 | | | | | 100 |
| Highly saturated nitrile rubber (A-6) | (parts) | | | | | | | | |
| FEF Carbon black | (parts) | 22.5 | 25 | 25 | | | | | |
| HAF Carbon black | (parts) | | | | | | | | |
| MT Carbon black | (parts) | | | | | | | | |
| Silica | (parts) | | | | 20 | 20 | 22.5 | 25 | 25 |
| Tri-2-ethylhexyl trimellitate | (parts) | 5 | 5 | 5 | 5 | 5 | 5 | 5 | 5 |
| 4,4'-Di-(α,α-dimethylbenzyl)diphenylamine | (parts) | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 |
| Polyoxyethylenealkylether phosphoric acid ester | (parts) | 1 | 1 | 1 | 1 | 1 | 1 | 1 | 1 |
| Silane coupling agent | (parts) | | | | 0.25 | 0.25 | 0.25 | 0.25 | 0.25 |
| Hexamethylenediamine carbamate | (parts) | 2.7 | 1.9 | 2.1 | 2.4 | 2 | 2.7 | 1.9 | 2.1 |
| 1,8-Diazabicyclo[5,4,0]-undecene-7, 60% product | (parts) | 4 | 4 | 4 | 4 | 4 | 4 | 4 | 4 |
| 1,3-Bis(t-butylperoxyisopropylbenzene), 40% product | (parts) | | | | | | | | |
| Aluminum hydroxide | (parts) | 3 | 3 | 3 | 3 | 3 | 3 | 3 | 3 |
| Hydrotalcite | (parts) | | | | | | | | |
| Magnesium oxide | (parts) | | | | | | | | |
| Zinc hydroxide | (parts) | | | | | | | | |
| Calcium hydroxide | (parts) | | | | | | | | |
| Evaluations of crosslinkable rubber composition Processability | | | | | | | | | |
| Mooney viscosity | | 82 | 80 | 80 | 81 | 83 | 83 | 81 | 81 |
| Sealability | | | | | | | | | |
| Compression set resistance | (%) | 42 | 40 | 40 | 37 | 36 | 36 | 37 | 36 |
| Metal adhesion | | | | | | | | | |
| Before immersed in LLC | | G | G | G | G | G | G | G | G |
| After immersed in LLC | | G | G | G | G | G | G | G | G |

G: GOOD
F: FAIR
NG: NO GOOD

TABLE 2

| | | Example | | | | | | |
|---|---|---|---|---|---|---|---|---|
| | | 19 | 20 | 21 | 22 | 23 | 24 | 25 |
| Composition of nitrile rubber composition | | | | | | | | |
| Carboxyl group-containing highly saturated nitrile rubber (A-1) | (parts) | 100 | | | | | 100 | |
| Carboxyl group-containing highly saturated nitrile rubber (A-2) | (parts) | | 100 | | | | | 100 |
| Carboxyl group-containing highly saturated nitrile rubber (A-3) | (parts) | | | 100 | | | | |
| Carboxyl group-containing highly saturated nitrile rubber (A-4) | (parts) | | | | 100 | | | |
| Carboxyl group-containing highly saturated nitrile rubber (A-5) | (parts) | | | | | 100 | | |
| Highly saturated nitrile rubber (A-6) | (parts) | | | | | | | |
| FEF Carbon black | (parts) | | | | | | 10 | 10 |
| HAF Carbon black | (parts) | 20 | 20 | 22.5 | 25 | 25 | | |
| MT Carbon black | (parts) | | | | | | 20 | 20 |
| Silica | (parts) | | | | | | | |
| Tri-2-ethylhexyl trimellitate | (parts) | 5 | 5 | 5 | 5 | 5 | 5 | 5 |
| 4,4'-Di-(α,α-dimethylbenzyl)diphenylamine | (parts) | 1.5 | 1.5 | 1.5 | 1.5 | 1.5 | 1.5 | 1.5 |
| Stearic acid | (parts) | 1 | 1 | 1 | 1 | 1 | 1 | 1 |

TABLE 2-continued

| | | | | | | | | |
|---|---|---|---|---|---|---|---|---|
| Polyoxyethylenealkylether phosphoric acid ester | (parts) | 1 | 1 | 1 | 1 | 1 | 1 | 1 |
| Silane coupling agent | (parts) | | | | | | | |
| Hexamethylenediamine carbamate | (parts) | 2.4 | 2 | 2.7 | 1.9 | 2.1 | 2.4 | 2 |
| 1,8-Diazabicyclo[5,4,0]-undecene-7, 60% product | (parts) | 4 | 4 | 4 | 4 | 4 | 4 | 4 |
| 1,3-Bis(t-butylperoxyisopropylbenzene), 40% product | (parts) | | | | | | | |
| Aluminum hydroxide | (parts) | 3 | 3 | 3 | 3 | 3 | 3 | 3 |
| Hydrotalcite | (parts) | | | | | | | |
| Magnesium oxide | (parts) | | | | | | | |
| Zinc hydroxide | (parts) | | | | | | | |
| Calcium hydroxide | (parts) | | | | | | | |
| Evaluations of crosslinkable rubber composition Processability | | | | | | | | |
| Mooney viscosity | | 89 | 85 | 83 | 82 | 81 | 86 | 82 |
| Sealability | | | | | | | | |
| Compression set resistance | (%) | 40 | 42 | 43 | 42 | 41 | 37 | 40 |
| Metal adhesion | | | | | | | | |
| Before immersed in LLC | | G | G | G | G | G | G | G |
| After immersed in LLC | | G | G | G | G | G | G | G |

| | | Example | | | Comparative example | | |
|---|---|---|---|---|---|---|---|
| | | 26 | 27 | 28 | 1 | 2 | 3 |
| Composition of nitrile rubber composition | | | | | | | |
| Carboxyl group-containing highly saturated nitrile rubber (A-1) | (parts) | | | | 100 | | |
| Carboxyl group-containing highly saturated nitrile rubber (A-2) | (parts) | | | | | | |
| Carboxyl group-containing highly saturated nitrile rubber (A-3) | (parts) | 100 | | | | | |
| Carboxyl group-containing highly saturated nitrile rubber (A-4) | (parts) | | 100 | | | | |
| Carboxyl group-containing highly saturated nitrile rubber (A-5) | (parts) | | | 100 | | | |
| Highly saturated nitrile rubber (A-6) | (parts) | | | | | 100 | 100 |
| FEF Carbon black | (parts) | 10 | 12.5 | 12.5 | 20 | 20 | 20 |
| HAF Carbon black | (parts) | | | | | | |
| MT Carbon black | (parts) | 25 | 25 | 25 | | | |
| Silica | (parts) | | | | | | |
| Tri-2-ethylhexyl trimellitate | (parts) | 5 | 5 | 5 | 5 | 5 | 5 |
| 4,4'-Di-(α,α-dimethylbenzyl)diphenylamine | (parts) | 1.5 | 1.5 | 1.5 | 1.5 | 1.5 | 1.5 |
| Stearic acid | (parts) | 1 | 1 | 1 | 1 | 1 | 1 |
| Polyoxyethylenealkylether phosphoric acid ester | (parts) | 1 | 1 | 1 | 1 | | |
| Silane coupling agent | (parts) | | | | | | |
| Hexamethylenediamine carbamate | (parts) | 2.7 | 1.9 | 2.1 | 2.4 | | |
| 1,8-Diazabicyclo[5,4,0]-undecene-7, 60% product | (parts) | 4 | 4 | 4 | 4 | | |
| 1,3-Bis(t-butylperoxyisopropylbenzene), 40% product | (parts) | | | | | 8 | 8 |
| Aluminum hydroxide | (parts) | 3 | 3 | 3 | | | 3 |
| Hydrotalcite | (parts) | | | | | | |
| Magnesium oxide | (parts) | | | | | | |
| Zinc hydroxide | (parts) | | | | | | |
| Calcium hydroxide | (parts) | | | | | | |
| Evaluations of crosslinkable rubber composition Processability | | | | | | | |
| Mooney viscosity | | 82 | 79 | 79 | 80 | 74 | 74 |
| Sealability | | | | | | | |
| Compression set resistance | (%) | 40 | 38 | 39 | 42 | 88 | 88 |
| Metal adhesion | | | | | | | |
| Before immersed in LLC | | G | G | G | G | G | G |
| After immersed in LLC | | G | G | G | NG | G | G |

G: GOOD
F: FAIR
NG: NO GOOD

Tables 1 and 2 indicate that the rubber crosslinked product obtained from the crosslinkable rubber composition composed of the carboxyl group-containing nitrile rubber (A), the polyamine-based crosslinking agent (B), and the metal-based acid acceptor (C) exhibited excellent compression set resistance and metal adhesion, and metal adhesion was maintained even after being immersed in LLC (Examples 1 to 28).

However, in a case where the carboxyl group-containing nitrile rubber (A) and the polyamine-based crosslinking agent (B) were compounded and the metal-based acid acceptor (C) was not compounded, the resulting crosslinked rubber exhibited lowered metal adhesion after being immersed in LLC (Comparative Example 1).

In a case where 1,3-bis(t-butylperoxyisopropyl)benzene was added as an organic peroxide crosslinking agent to the highly saturated nitrile rubber (A-6) instead of the polyamine-based crosslinking agent, the resultant rubber crosslinked product exhibited inferior compression set resistance (Comparative Example 2).

Furthermore, even if the above-mentioned peroxide crosslinking agent was added to the highly saturated nitrile rubber (A-6), and the metal-based acid acceptor (C) was further added, the result of inferior compression set resistance remained unchanged (Comparative Example 3).

Although the embodiments of the present invention have been described above by way of examples, the present invention is not limited to specific embodiments and examples, and various modifications and alterations may be made within the scope of the invention described in the claims.

This international application is based on and claims priority of Japanese Patent Application No. 2016-213488 filed Oct. 31, 2016, the entire contents of which are hereby incorporated by reference.

The invention claimed is:

1. A crosslinkable rubber composition comprising:
a carboxyl group-containing nitrile rubber (A) containing a residual halogen or a halogen compound derived from a coagulant, the carboxyl group-containing nitrile rubber (A) having an iodine value of 120 or less;
a polyamine-based crosslinking agent (B); and
a metal-based acid acceptor (C) selected from aluminum hydroxide and hydrotalcite.

2. The crosslinkable rubber composition according to claim 1, wherein:
the carboxyl group-containing nitrile rubber (A) includes, based on 100 wt % of total monomer units in the carboxyl group-containing nitrile rubber (A):
5 to 60 wt % of α,β-ethylenically unsaturated nitrile monomer unit (a1),
0.5 to 12 wt % of α,β-ethylenically unsaturated dicarboxylic acid monoester monomer unit (a2), and
20 to 90 wt % of conjugated diene monomer unit (a3), and
at least a part of the conjugated diene monomer unit (a3) is hydrogenated.

3. The crosslinkable rubber composition according to claim 1, wherein
the content of the metal-based acid acceptor (C) is 0.1 to 20 parts by weight with respect to 100 parts by weight of the carboxyl group-containing nitrile rubber (A).

4. The crosslinkable rubber composition according to claim 1, wherein
the content of the metal-based acid acceptor (C) is 1 to 5 parts by weight with respect to 100 parts by weight of the carboxyl group-containing nitrile rubber (A).

5. A rubber crosslinked product prepared by crosslinking the crosslinkable rubber composition according to claim 1.

6. A complex comprising the rubber crosslinked product according to claim 5 complexed with metal.

\* \* \* \* \*